2,831,032
PREPARATION OF SODIUM MERCAPTIDES

Harry Tilles, El Cerrito, Calif.

No Drawing. Application December 23, 1955
Serial No. 554,924

8 Claims. (Cl. 260—609)

This invention relates to a novel method of preparing anhydrous sodium alkyl mercaptides. The prior method of preparing sodium alkyl mercaptides has been to react the corresponding mercaptan with sodium alkoxide. This is an equilibrium reaction and, depending upon the relative acidity of the mercaptan and the sodium alkoxide, there is always more or less of the sodium alkoxide left, together with the sodium mercaptide which is formed. Further, it is ordinarily necessary to purify the resulting product by distilling off the alcohol which is formed by the reaction. Thus, the process of making sodium alkyl mercaptides has given low yields and results in a product which must be further treated before it is suitable for use.

If one attempts to make the sodium alkyl mercaptides by the direct reaction of a piece of metallic sodium with the corresponding mercaptan, such as n-propyl mercaptan, there is hardly any evidence of reaction at 30° C. If the mercaptan is a tertiary alkyl mercaptan, there is even less evidence of reaction. For instance, if tertiary alkyl mercaptan is added to metallic sodium at room temperature, there is no evidence of reaction, while if the mixture is gradually heated to 90° C., there is only a slight indication of reaction at the surface of the sodium and the reaction promptly stops when the sodium becomes coated with insoluble mercaptide. Therefore, such attempts are hazardous since unreacted sodium still remains in the system.

I have found that if sodium is prepared in finely dispersed form in an inert solvent, it will react directly with mercaptans to give the corresponding anhydrous sodium alkyl mercaptides in high yield. Further, since no alcohol is produced by the reaction, the sodium alkyl mercaptide may be further reacted with other substances without the necessity of any intervening purification step.

The sodium dispersion which is used may be prepared by methods well-known to those skilled in the art. For instance, I have found very satisfactory dispersions can be made for the purposes of the present invention by following the procedures set forth on pages 8 and 9 of the booklet, "Sodium Dispersions," published by National Distillers Chemical Co., 1953 edition. In general, the method comprises stirring a mixture of a dispersing medium, such as xylene, a minor amount of a dispersing aid, such as oleic acid, with molten sodium. In this way, a stable, finely divided sodium dispersion is obtained. Although such dispersions are ordinarily stated to be in the 10–15 micron size range, I have found that good results can be obtained even with a particle size as large as 200 microns.

The following non-limiting examples illustrate various embodiments of the present invention.

*Example 1.*—A sodium dispersion was prepared following the general procedure referred to above, wherein xylene was used as the dispersing solvent and oleic acid was used as the stabilizing agent. The particle size of the sodium varied from 5 to 200 microns. The dispersion contained equal parts of xylene and sodium on a weight basis and contained about 1% of oleic acid. The dispersion, equivalent to an amount of 4.6 parts (0.20 mole) of sodium, was transferred to a glass reactor which had previously been flushed out with argon. A solution of 13.6 parts (0.22 mole) of ethanethiol dissolved in 22 parts of xylene, was then gradually added to the sodium dispersion over an interval of 30 minutes. The temperature was maintained at from 25 to 36° C. by cooling. The sodium ethylmercaptide formed as a finely divided slurry of crystals which could be easily stirred. The mixture was filtered and washed several times with small portions of xylene, taking as much care as possible to avoid prolonged exposure to the air. The solid was then dried in the vacuum oven at 60–65° C. at a pressure of 30 mm. of Hg. The product was a white, free-flowing powder and was obtained in a yield of 16.1 g. (95.9%).

*Example 2.*—The general procedure of Example 1 was followed except that 16.7 parts (0.22 mole) of 1-propanethiol was added at 50° C. to sodium dispersion equivalent to 4.6 parts (0.20 mole) of sodium. The reaction produced n-propylmercaptide in a yield of 19.0 g. (97.0%).

*Example 3.*—The general procedure of Example 1 was followed except that 16.9 parts (0.188 mole) of 2-methyl-1-propanethiol was used, together with sodium dispersion equal to 3.45 parts (0.15 mole) of sodium. The reaction produced sodium 2-methylpropylmercaptide.

*Example 4.*—The procedure of Example 3 was followed except that 2-methyl-2-propanethiol was used to produce sodium 2-methyl-2-propylmercaptide.

*Example 5.*—The procedure of Example 3 was followed except that 16.9 parts (0.188 mole) of 1-butanethiol was used to produce sodium butylmercaptide.

*Example 6.*—The procedure of Example 3 was followed except that 13.3 parts (0.188 mole) of allyl mercaptan was utilized to make sodium allylmercaptide.

*Example 7.*—The general procedure of Example 1 was followed except that 25 parts (0.52 mole) of methanethiol was added in small portions at 50–60° C. to sodium dispersion equivalent to 2.3 parts (0.1 mole) of sodium. Sodium dispersion reacted readily as is evidenced by the color change of the reaction from a purplish hue to a white color to produce sodium methylmercaptide. This reaction must be conducted with caution.

*Example 8.*—The general procedure of Example 1 was followed except that 114 parts (1.10 mole) of 1-pentanethiol, and sodium dispersion equivalent to 23 parts (1.0 mole of sodium were used to produce sodium n-amylmercaptide.

*Example 9.*—The general procedure of Example 1 was followed except that 16.7 parts (0.22 mole) of 2-propanethiol was added at 50° C. to sodium dispersion equivalent to 4.6 parts (0.20 mole) of sodium. The reaction produced sodium 1-propylmercaptide in a yield of 18.9 grams (96.5%).

When primary mercaptans are used as the starting material, the temperature can be from 25° C. to the boiling point of the solvent, while if secondary or tertiary mercaptans are used, the temperature can be from 50° C. to the boiling point of the solvent.

I claim:

1. The process of making a sodium mercaptide selected from the group consisting of lower alkyl and lower alkenyl mercaptides comprising reacting a thiol selected from the group consisting of lower alkane thiols and lower alkene thiols with finely dispersed sodium.

2. The process of claim 1 wherein the dispersion has a maximum particle size of about 200 microns.

3. The process of claim 1 wherein the reaction is carried out in the presence of an inert solvent.

4. The process of making sodium n-propyl mercaptide comprising reacting 1-propanethiol with finely dispersed sodium.

5. The process of making sodium ethyl mercaptide comprising reacting ethanethiol with finely dispersed sodium.

6. The process of making sodium n-butyl mercaptide comprising reacting 1-butanethiol with finely dispersed sodium.

7. The process of making sodium isobutyl mercaptide comprising reacting 2-methyl-1-propanethiol with finely dispersed sodium.

8. The process of making sodium n-amyl mercaptide comprising reacting 1-pentanethiol with finely dispersed sodium.

References Cited in the file of this patent

UNITED STATES PATENTS 2,064,558   Morton _____ Dec. 15, 1936